United States Patent [11] 3,573,667

[72] Inventors Chih-Yo Lawrence Kao;
Carl F. Kurth, Andover, Mass.
[21] Appl. No. 864,664
[22] Filed Oct. 8, 1969
[45] Patented Apr. 6, 1971
[73] Assignee Bell Telephone Laboratories Incorporated
Murray Hill, N.J.

[54] AUTOMATIC EQUALIZER ADJUSTMENT APPARATUS
5 Claims, 2 Drawing Figs.

[52] U.S. Cl. .......... 333/18, 333/28
[51] Int. Cl. .......... H04b 3/14, H03h 7/16
[50] Field of Search .......... 333/18, 28, 28 (T)

[56] References Cited
UNITED STATES PATENTS 2,859,413 11/1958 Ketchledge .......... 333/18X
2,876,283 3/1959 Lundry .......... 333/18X
3,477,043 11/1969 Farrow .......... 333/28X
3,489,848 1/1970 Perreault .......... 333/28X

*Primary Examiner*—Herman Karl Saalbach
*Assistant Examiner*—T. Vezeau
*Attorneys*—R. J. Guenther and William L. Keefauver

ABSTRACT: An equalizer of a coaxial transmission system is automatically adjusted by applying a sweep signal to the equalizer and comparing the output of the equalizer with a predetermined reference signal to develop an error signal. The output signal of the equalizer is simultaneously converted into a plurality of weighting signals, each representing the energy content of the output signal within a passband which includes one equalizer transmission network characteristic, i.e., "-bump." Each weighting signal is multiplied by the error signal and integrated to develop a control signal for the associated equalizer transmission network.

INVENTORS: C. KAO
C. F. KURTH
BY Gerard E. Murphy
ATTORNEY

AUTOMATIC EQUALIZER ADJUSTMENT APPARATUS

BACKGROUND OF THE INVENTION

1. Field of the Invention

This invention pertains to signal transmission systems and, more particularly, to means for correcting imperfections in the equalizing apparatus of such systems.

Signal transmission systems, particularly those which transmit a broadband signal over a considerable distance, suffer from transmission imperfections. These imperfections are present because of the impossibility of exactly anticipating what variations in gain or phase will be encountered when the system is in use. Fixed equalizers may be designed which nominally correct for variations in the transmission characteristics of the system; however, transmission is also a function of ambient temperature and other unpredictable parameters. It is therefore necessary to provide, in the system, adjustable equalizing networks which can be adapted to remove imperfections not corrected by fixed equalizers.

2. Description of the Prior Art

A typical equalizer adjustment system is described in the Bell Laboratories Record, Jul.—Aug. 1967 at page 231. An equalizer in such a system comprises a plurality of amplifier networks, each individually adjustable and exhibiting a transmission characteristic having a "bump" shape. The respective transmissibility of each amplifier network is adjusted via the use of discrete test signals or tones, one per transmission characteristic, i.e., "bump." This technique, though eminently satisfactory in certain applications, has, in other applications, shortcomings which arise because of the reliance upon only one discrete test signal per equalizer network frequency band. It is an object of this invention to overcome this limitation.

SUMMARY OF THE INVENTION

In accordance with the principles of this invention, this and other objects are accomplished by applying a test sweep signal, of constant amplitude and spectrum coextensive with the signal transmission band, to the equalizer which is to be adjusted. The output signal of the equalizer is compared with a predetermined reference signal to develop an error signal, and is simultaneously converted into a plurality of weighting signals, each proportional to the energy content of the equalizer output signal within one of the equalizer network transmission bands or bumps. Each weighting signal is multiplied by the aforesaid error signal and integrated to develop a control signal for the associated equalizer transmission network.

These and further features and objects of this invention, its nature and various advantages will become more apparent upon consideration of the attached drawings and of the following detailed description of the drawings.

DETAILED DESCRIPTION OF THE INVENTION

Figures 1, 2:
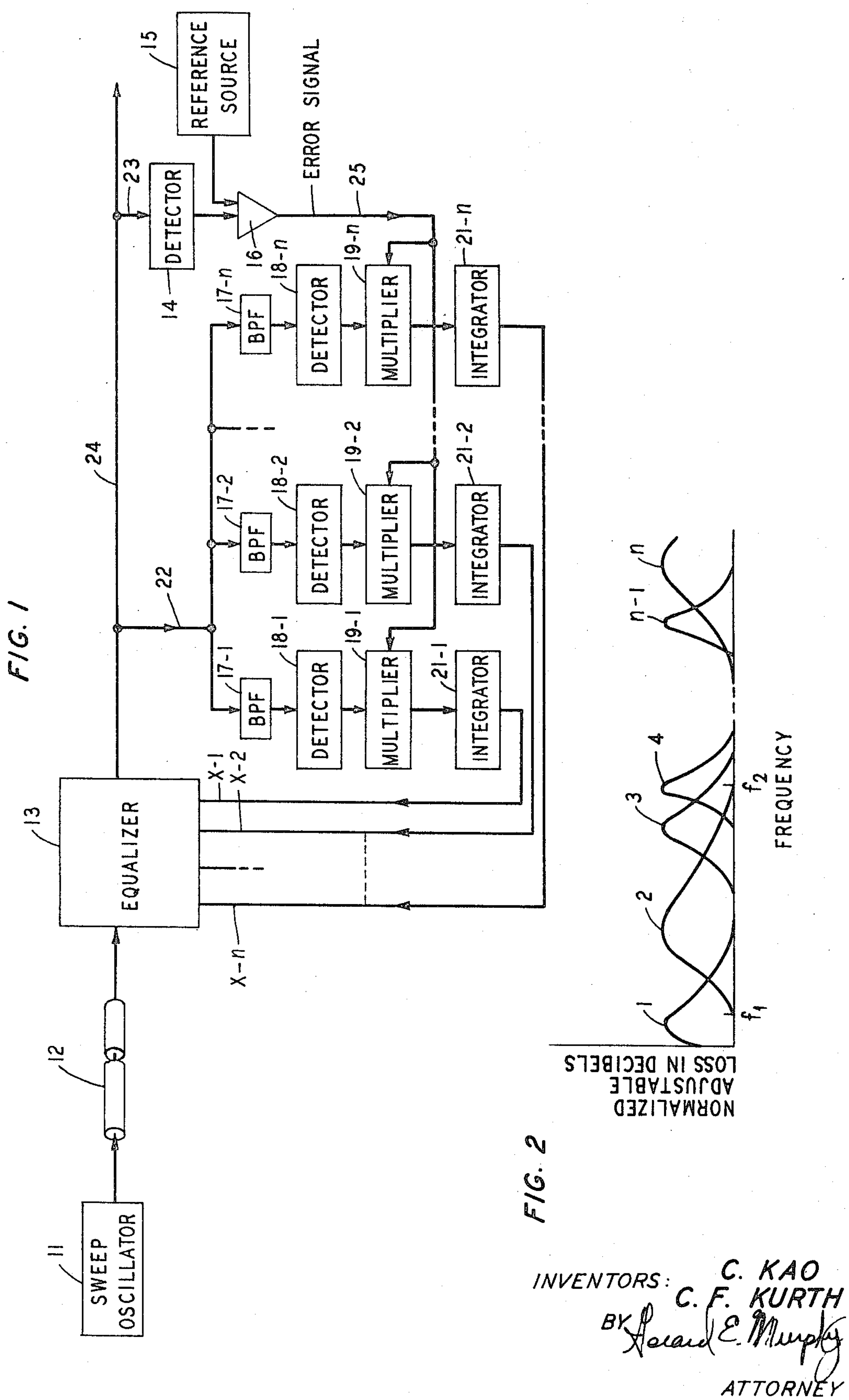
FIG. 1 is a block diagram of an illustrative embodiment of the equalizer adjustment apparatus of this invention.
FIG. 2 illustrates the transmission band characteristics, i.e., "bumps," of the equalizer used in the apparatus depicted in FIG. 1.

The automatic equalizer adjustment apparatus of this invention finds particular use in long-haul cable transmission systems such as the Bell System L-4 Coaxial Cable System described in the Bell Laboratories Record, Jul.—Aug. 1967, and the Bell System Technical Journal, Vol. 48, Apr. 1969. In such systems an equalizer, commonly known as an A or B equalizer, is used to provide the adjustable gain necessary for correcting gain deviations that remain after the operation of other, less complex, regulating repeaters. These gain deviations arise from both the random effects of line repeater design error and from variations caused by changes in repeater temperature.

An equalizer, e.g., may consist of four amplifiers located in the signal transmission path. Amplifier gains are controlled by six independently adjustable equalizer networks, each affecting a different band of frequencies within the signal band spectrum. The transmission characteristics of the networks, as shown in FIG. 2, may overlap and are generally referred to as "bumps," because of their shape. They are to be distinguished from other equalizer transmission characteristics such as cosine shapes, etc. Bump shapes can be achieved by relatively simple Bode equalizer network sections and offer attractive advantages over cosine shapes with respect to realization and ease of adjustment. The equalizer network bands overlap so as to provide adjustment throughout the signal spectrum. Each equalizer network's influence on the transmitted signals is controlled by the impedance of a thermistor (a temperature sensitive resistor) which is varied by changing the value of a direct current flowing through a heating element. Adjustment of the network, therefore, requires only setting the proper heater current. Memory circuits, remotely and manually adjusted at predetermined discrete frequencies or tones, one tone per equalizer bump, establish the controlling heater currents. Further detailed discussion of such equalizers may be found on page 889 of the above-cited Bell System Technical Journal.

It is noted that the above-described equalizer system uses only one discrete test tone per equalizer network transmission characteristic, i.e., bump. It has been found that though such a scheme is satisfactory, it does not achieve the desired level of accuracy, over the entire signal band, required in certain communication systems. Thus, it is the primary object of this invention to adjust the transmission characteristics of equalizers, of the type described, over the entire signal spectrum.

In accordance with this invention, as shown in FIG. 1, sweep oscillator 11, of any well-known construction, applies a test sweep frequency signal of constant amplitude to cable transmission path 12. This operation requires that the individual cable and equalizer, which is being adjusted, be taken out of service and a spare cable and equalizer be switched in to continue service. Since this need occur only on the average of one or two times a year, no serious detrimental effects result. The spectrum of the test sweep signal is coextensive with the transmission band of the system under test. The test signal is conveyed by coaxial cable 12 and applied to equalizer 13. Equalizer 13 may be any well-known bump-type equalizer such as the above-described A or B equalizer. Illustratively, it is assumed that equalizer 13 has *n*, a predetermined number of bumps, i.e., adjustable network transmission characteristics, as depicted in FIG. 2. The test signal after modification by equalizer 13 is conveyed via lines 24 and 23 to detector 14. Of course, main line 24 which is normally connected to the next cable length of the system is disconnected therefrom. Detector 14, e.g., a rectifier, develops a signal proportional to the energy content of the equalized signal over the entire signal band. This proportional signal is compared in difference amplifier 16 with a reference signal of predetermined amplitude corresponding to the desired optimum level of signal transmission. Source 15, which supplies the reference signal, may be of any well-known construction. The difference or error signal developed by amplifier 16 is supplied via line 25 to a plurality of multiplier networks 19–1, 19–2, ... **19–*n***.

Simultaneous with the above described operation, the output signal emanating from equalizer 13 is also applied, via line 22, to plurality of band-pass filters 17–1, 17–2, ... **17–*n***, each having band-pass characteristics, i.e., passbands, coextensive with the frequency range, passband, of each of the *n* bumps of equalizer 13. For example, filter 17–2 has a passband encompassing the frequency range $f_2$—$f_1$. Signals emanating from filters 17 are supplied, individually, to detectors 18–1, 18–2, ... **18–*n***, to develop weighting signals having amplitudes corresponding to the energy content of the equalized signal in each of the *n* predetermined bump frequency ranges. The weighting signals are each multiplied by the error signal, present on line 25, in multipliers 19–1, 19–2, ... **19–*n*, and the product signals developed are then applied to integrators 21–1, 21–2, ... 21–*n***. Resultant integrated signals, i.e., control signals, which are proportional to the level of improper equalization in each bump range, are then applied via lines *x*–1, *x* –2, ... *x*–*n* to the bump control terminals of equalizer 13 to effectuate the proper change in equalization of each of the *n* equalizer networks. The bump control terminals are, of course, connected to the controlling thermistor circuits of the networks. Thus, instead of relying on one test tone per equalizer transmission system characteristic, the present system utilizes a plurality of control signals which are proportional to the system misalignment over the entire signal spectrum.

It is to be understood that the embodiments shown and described herein are illustrative of the principles of this invention only, and that modifications of this invention may be implemented by those skilled in the art without departing from the scope and spirit of the invention. For example, the Q or stiffness of each bump may be changed by altering one or more network parameters of each equalizer. Control signals, for this purpose, may be developed in the same manner as described, with the two exceptions that the error signal is first differentiated before application to multipliers 19–1 to **19–*n***, and lines *x*–1 to *x*–*n* are connected to the stiffness control terminals of equalizer 13. It is, of course, apparent that by duplicating the multiplier and integrating apparatus shown, both equalization and stiffness adjustments may be made simultaneously. Furthermore, the error signal developed y by the illustrated system may be squared, prior to its application to multipliers 19–1 to **19–*n***, so that a squared error adjustment may be accomplished. However, this necessitates that a "sign" or polarity detector, of any well-known type, be also used to determine whether the amplitude of the control signal is to be increased or decreased, since squaring obliterates polarity information.

We claim:

1. In a transmission system wherein an equalizer having a plurality of adjustable transmission networks is excited by an applied signal, the combination comprising:
   means for developing an error signal corresponding to the difference between an output signal, developed by said equalizer, and a predetermined reference signal;
   means for developing a plurality of weighting signals;
   means responsive to said error signal for modifying the magnitude of each of said weighting signals; and
   and means for processing said modified weighting signals to develop control signals for said equalizer transmission networks.

2. Apparatus for adjusting an equalizer, excited by a swept frequency signal, having a plurality of adjustable transmission networks comprising:
   means for developing an error signal corresponding to the difference between the signal developed by said equalizer and a predetermined reference signal;

means for developing a plurality of weighting signals, each representing the energy content in predetermined passbands, of the signal transmitted by said equalizer;
   means for forming product signals of each of said weighting signals and said error signal; and
   and means for processing said product signals to develop control signals for said transmission networks.

3. Automatic equalizer adjustment apparatus comprising:
   means for developing a swept frequency signal;
   equalizer means, having a plurality of adjustable transmission networks, responsive to said swept frequency signal for developing an output signal;
   means for developing an error signal corresponding to the difference between said output signal and a predetermined reference signal;
   means for developing a plurality of weighting signals, each representing the energy content of said output signal in predetermined passbands;
   means for forming product signals of each of said weighting signals and said error signal; and
   and means responsive to said product signals for adjusting said transmission networks.

4. Automatic equalizer adjustment apparatus comprising:
   equalizer means having a plurality of adjustable transmission networks;
   means for applying a predetermined swept frequency signal to said equalizer means;
   means for developing an error signal corresponding to the difference between the signal developed by said equalizer means and a predetermined reference signal;
   means for developing a plurality of weighting signals;
   means for forming product signals of each of said weighting signals and said error signal; and
   and means for processing said product signals to develop control signals for said transmission networks.

5. Automatic equalizer adjustment apparatus comprising:
   equalizer means having a plurality of adjustable band-pass transmission networks;
   means for applying a predetermined swept frequency signal to said equalizer means;
   means for developing an error signal corresponding to the difference between the signal transmitted by said equalizer means and a predetermined reference signal;
   means for developing a plurality of weighting signals, each representing the energy content of the signal transmitted by said equalizer means in predetermined passbands coextensive with the passbands of said adjustable networks;
   means for forming product signals of each of said weighting signals and said error signal; and
   and means for integrating each of said product signals to develop control signals for adjusting the transmission characteristics of said band-pass transmission networks.

UNITED STATES PATENT OFFICE
CERTIFICATE OF CORRECTION

Patent No. 3,573,667 Dated April 6, 1971

Inventor(s) Chih-yu Kao and Carl F. Kurth

It is certified that error appears in the above-identified patent and that said Letters Patent are hereby corrected as shown below:

In Item [72] Inventors, appearing on the page of the Abstract, "Chih-Yo Lawrence Kao" should read --Chih-yu Kao, Lawrence, Mass.---.

Signed and sealed this 14th day of December 1971.

(SEAL)
Attest:

EDWARD M.FLETCHER,JR.
Attesting Officer

ROBERT GOTTSCHALK
Acting Commissioner of Pate

FORM PO-1050 (10-69) USCOMM-DC 6037